United States Patent
Kim et al.

(10) Patent No.: US 10,939,082 B2
(45) Date of Patent: Mar. 2, 2021

(54) PROCESSOR, DISPLAY DRIVER, AND ELECTRONIC DEVICE

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Taehyun Kim, Beijing (CN); Shanfu Jiang, Beijing (CN)

(73) Assignees: BOE TECHNOLOGY GROUP CO., LTD., Beijing (CN); CHENGDU BOE OPTOELECTRONICS TECHNOLOGY CO., LTD., Sichuan (CN)

( * ) Notice: Subject to any disclaimer, the term of this patent is extended or adjusted under 35 U.S.C. 154(b) by 396 days.

(21) Appl. No.: 15/865,666

(22) Filed: Jan. 9, 2018

(65) Prior Publication Data

US 2018/0343429 A1 Nov. 29, 2018

(30) Foreign Application Priority Data

May 25, 2017 (CN) .......................... 201710378363.2

(51) Int. Cl.
*H04N 9/64* (2006.01)
*G09G 3/3208* (2016.01)
(Continued)

(52) U.S. Cl.
CPC ............... *H04N 9/646* (2013.01); *G09G 3/20* (2013.01); *G09G 3/3208* (2013.01); *G09G 5/003* (2013.01);
(Continued)

(58) Field of Classification Search
CPC .......... H04N 9/646; H04N 9/045; G09G 3/20; G09G 5/003; G09G 5/10; G09G 3/3208;
(Continued)

(56) References Cited

U.S. PATENT DOCUMENTS

2002/0078311 A1* 6/2002 Matsuzaki ........... G11C 7/1051
711/149
2004/0119677 A1* 6/2004 Nakamura ........... G09G 3/3208
345/89
(Continued)

FOREIGN PATENT DOCUMENTS

CN 1920939 A 2/2007
CN 105427777 A 3/2016
(Continued)

OTHER PUBLICATIONS

The Second Chinese Office Action dated Apr. 30, 2019; Appln. No. 201710378363.2.
(Continued)

*Primary Examiner* — Chan S Park
*Assistant Examiner* — Elisa M Rice

(57) ABSTRACT

The present disclosure provides a processor, a display driving circuit, and an electronic device. The processor includes: a memory being divided into a first part that stores correction data for correcting an image signal, a second part that stores data of an image signal to be displayed, and a third part that stores data of an application to be executed; and an output port configured to transmit the data of the image signal and the correction data stored in the memory to an external display driving circuit, separately.

7 Claims, 3 Drawing Sheets

(51) Int. Cl.
*G09G 5/10* (2006.01)
*H04N 9/04* (2006.01)
*G09G 5/00* (2006.01)
*G09G 3/20* (2006.01)

(52) U.S. Cl.
CPC .............. *G09G 5/10* (2013.01); *H04N 9/045* (2013.01); *G06T 2207/10024* (2013.01); *G09G 2320/0233* (2013.01); *G09G 2320/0242* (2013.01); *G09G 2340/00* (2013.01); *G09G 2360/18* (2013.01)

(58) Field of Classification Search
CPC ....... G09G 2320/0233; G09G 2360/18; G09G 2340/00; G09G 2320/0242; G06T 2207/10024
See application file for complete search history.

(56) References Cited

U.S. PATENT DOCUMENTS

| | | | |
|---|---|---|---|
| 2004/0178743 A1 | 9/2004 | Miller et al. | |
| 2007/0040841 A1* | 2/2007 | Kim | G09G 5/003 345/531 |
| 2007/0132858 A1* | 6/2007 | Chiba | H04N 1/6027 348/222.1 |
| 2011/0234644 A1* | 9/2011 | Park | G09G 3/2003 345/690 |
| 2015/0185820 A1 | 7/2015 | Hendry et al. | |
| 2015/0206331 A1* | 7/2015 | Nose | G06T 5/009 345/617 |
| 2015/0339967 A1 | 11/2015 | Shin | |
| 2016/0078833 A1* | 3/2016 | Kim | G06F 3/1431 345/204 |
| 2016/0217724 A1 | 7/2016 | Kim | |
| 2016/0329033 A1 | 11/2016 | Woo et al. | |
| 2016/0335986 A1 | 11/2016 | Bae et al. | |
| 2017/0069277 A1 | 3/2017 | Hsieh et al. | |
| 2018/0268774 A1 | 9/2018 | Kim et al. | |

FOREIGN PATENT DOCUMENTS

| | | |
|---|---|---|
| CN | 105590577 A | 5/2016 |
| CN | 105825800 A | 8/2016 |
| CN | 105917402 A | 8/2016 |
| CN | 106128357 A | 11/2016 |
| CN | 106415697 A | 2/2017 |
| CN | 106504711 A | 3/2017 |
| CN | 106531054 A | 3/2017 |
| WO | 2010/132994 A1 | 11/2010 |

OTHER PUBLICATIONS

The First Chinese Office Action dated Oct. 26, 2018; Appln. No. 201710378363.2.

* cited by examiner

PROCESSOR, DISPLAY DRIVER, AND ELECTRONIC DEVICE

The present disclosure claims priority of Chinese Patent Application No. 201710378363.2 filed on May 25, 2017, the disclosure of which is incorporated herein by reference in its entirety as part of the present disclosure.

TECHNICAL FIELD

The present disclosure relates to a processor, a display driver, and an electronic device.

BACKGROUND

At present, when displaying is carried out on a display device, it usually needs to perform various image processing on an inputted image signal, such as image enhancement processing, white balance processing, Mura removing processing, and the like.

When performing the Mura removing processing, a manner commonly adopted in an external compensation system is to store a compensation coefficient for Mura removing in a non-volatile memory, such as Flash ROM. Thereafter, at the time of executing display driving, a driving integrated circuit (IC) duplicates the compensation coefficient from the Flash ROM to an RAM capable of high-speed reading, and then continuously refreshes on a frame-by-frame basis.

Currently, demand tends of display devices applicable to mobile terminal devices such as smartphone or tablet are large-size, high-resolution. In addition, more and more functions, are required for OLED quality, so compensation demands for OLED also increase. Under normal circumstances, if the resolution of display devices increases, the amount of data to be compensated can only become larger, and when the amount of data becomes larger, the size of RAM will increase in a certain proportion. In the case of display devices applicable to mobile terminal devices, the large-capacity external compensation RAM memory is not applicable due to the limitation of chip size and the cost increase caused by large-capacity RAM.

For this, it is desirable to provide a processor, a display driver, and an electronic device, which are capable of performing various image correction processing on an image signal without requiring a large-capacity external compensation RAM memory.

SUMMARY

According to an embodiment of the present disclosure, there is provided a processor, comprising a memory being divided into a first part that stores correction data for correcting an image signal, a second part that stores data of an image signal to be displayed, and a third part that stores data of an application to be executed; and an output port configured to transmit the data of the image signal and the correction data stored in the memory to an external display driving circuit, separately.

Optionally, the output port comprises:

a first output port configured to transmit the data of the image signal stored in the memory to a first receiving port of the external display driving circuit through a first transmission path; and a second output port configured to transmit the correction data stored in the memory to a second receiving port of the external display driving circuit through a second transmission path separated from the first transmission path.

Optionally, the output port comprises:

a multiplexer configured to receive the data of the image signal and the correction data stored in the memory; and a third output port configured to transmit the data of the image signal received by the multiplexer to a first receiving port of the external display driving circuit and to transmit the correction data received by the multiplexer to a second receiving port of the external display driving circuit, in a time division manner and through a third transmission path.

Optionally, the processor further comprises:

a control circuit configured to receive a setting command inputted externally and to determine a port for reading correction data from a storage of an external display device into the first part of the memory according to the setting command.

Optionally, the processor is an application processor in a mobile terminal device, and the memory is a volatile memory used as an internal memory of the processor.

Optionally, the correction data is a compensation coefficient for performing compensation processing of removing Mura on the image signal.

Optionally, the processor further comprises: a correction circuit configured to perform a predetermined correction operation on the image signal by using the correction data.

According to another embodiment of the present disclosure, there is provided a display driving circuit, comprising:

a first input port configured to receive data of an image signal for executing displaying as inputted from an external processor;

a second input port configured to receive correction data for performing a predetermined correction operation on the received image signal as inputted from the external processor; and a correction circuit configured to perform the predetermined correction operation on the received image signal by using the received correction data.

Optionally, the display driving circuit further comprises:

an image enhancement circuit configured to perform image enhancement processing on the image signal received through the first input port; and a white balance processing circuit configured to perform white balance processing on the image signal that has been subjected to image enhancement processing and to output the image data that has been subjected to white balance processing to the correction circuit.

Optionally, the correction circuit further comprises:

a linear memory configured to store the correction data and the image data that has been subjected to white balance processing, the correction data being a compensation coefficient for performing compensation processing of removing Mura on the image signal;

the correction circuit performs compensation processing of removing Mura on the image data that has been subjected to white balance processing by using the correction data.

Optionally, the display driving circuit further comprises: a digital-to-analog conversion circuit configured to convert the image signal that has been subjected to the compensation processing of removing Mura as executed by the correction circuit into an analog signal and to output the analog signal to a display panel.

Optionally, the display driving circuit further comprises: a frame buffer memory disposed between the correction circuit and the digital-to-analog conversion circuit, and configured to store data of the image signal of one frame to support an MIPI command mode.

According to yet another embodiment of the present disclosure, there is provided an electronic device, comprising:

a processor as described in the above embodiments;

a display driving circuit as described in the above embodiments;

a display panel configured to perform image displaying according to the analog signal outputted from the display driving circuit.

DETAILED DESCRIPTION OF THE EMBODIMENTS

Hereinafter, the processor, the display driving circuit, and the electronic device according to the embodiments of the present disclosure will be described in detail in combination with the drawings.

First Embodiment

The processor, the display driving circuit, and the electronic device according to a first embodiment of the present disclosure will be described below in detail with reference to FIGS. 1 to 3. Such electronic device may be, for example, a mobile terminal device such as smart phone, tablet, PDA, or the like. In this embodiment, description will be given taking smart phone as an example.

Figure 1:
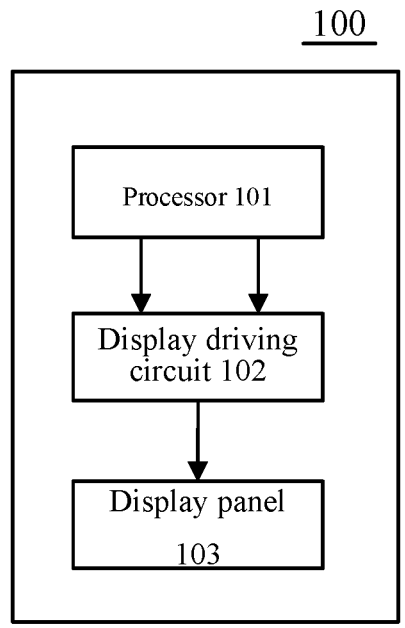
FIG. 1 is a configuration block diagram illustrating an electronic device according to a first embodiment of the present disclosure.

FIG. 1 is a configuration block diagram illustrating an electronic device according to a first embodiment of the present disclosure. As shown in FIG. 1, the electronic device 100 according to the first embodiment of the present disclosure comprises:

a processor 101 configured to store, in a memory thereof, data of an image signal to be displayed and store correction data for correcting an image signal;

a display driving circuit 102 configured to receive the image signal and the correction data separately transmitted from the processor, perform correction processing on the image signal, and output the corrected image signal; and a display panel 103 configured to receive the image signal outputted from the display driving circuit and thereby carry out image displaying accordingly.

In this embodiment, the processor 101 is, for example, an application processor in a smart phone.

As known to those skilled in the art, the full name of application processor is Multimedia Application Processor, referred to as MAP in short. The application processor is an ultra-large-scale integrated circuit that extends audio/video functions and dedicated interfaces based on low-power CPU. MAP arises along with the smart phone, an ordinary phone only has call making and text messaging functions, the smart phone is further provided with digital camera, MP3 player, FM radio receiver, video image playback and other functions in addition to the communication function, a baseband processor is no longer capable of handling these new functions. In addition, video and audio (high-fidelity music) have a processing method different from voice, voice only needs to be understandable, so as to achieve the aim of conveying information. Video requires bright chromatic images, melodious stereo sound, the purpose is to enable people to get the greatest sensual experience. In order to realize these functions, another co-processor is needed to process these signals specially, it is the application processor.

Such application processor is internally provided with an RAM memory that serves as a memory for said processor. When the application processor is started, data of an application to be executed is loaded into the RAM memory. In consideration of that a chip size of a display module for the mobile terminal device is limited and using a large-capacity RAM leads to cost increase, in order to implement the correction processing such as Mura removing, the technical solution of using the RAM memory of the application processor is worked out in the present disclosure. Such technical solution does not additionally require an RAM memory for storing a compensation coefficient for Mura removing, because of it can effectively utilize the RAM memory of the application processor.

Figure 2:
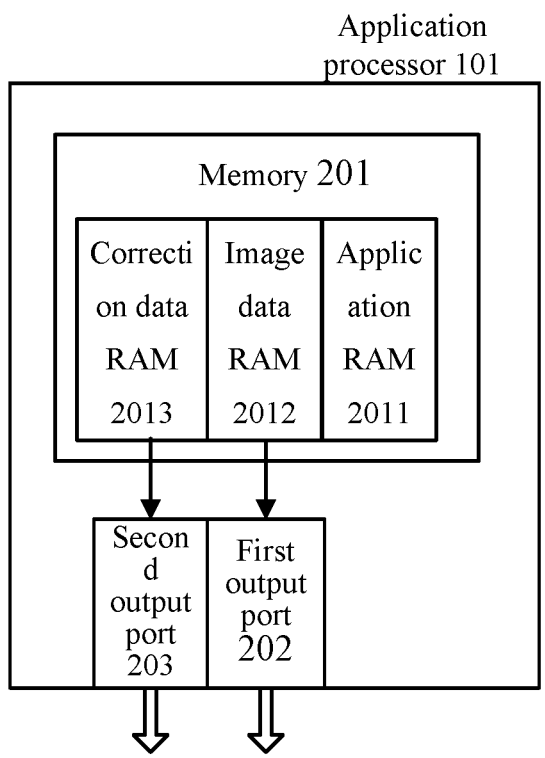
FIG. 2 is a configuration block diagram illustrating a processor in the electronic device according to the first embodiment of the present disclosure.

Specifically, FIG. 2 shows a configuration block diagram of a first example of the processor 101 in the electronic device according to an embodiment of the present disclosure.

As shown in FIG. 2, the processor 100 in the first example according to an embodiment of the present disclosure comprises:

a memory 201 that is divided into a first part that stores correction data for correcting an image signal, a second part that stores data of an image signal to be displayed, and a third part that stores data of an application to be executed;

a first output port 202 configured to transmit the data of the image signal stored in the memory to a first receiving port of the external display driving circuit through a first transmission path; and a second output port 203 configured to transmit the correction data stored in the memory to a second receiving port of the external display driving circuit through a second transmission path separated from the first transmission path.

Specifically, as shown in FIG. 2, the RAM memory 201 internal to the application processor 200 in the electronic device is divided into three parts. The first part 2013 stores correction data for correcting an image signal. The second part 2012 stores data of an image signal to be displayed. The third part 2011 is for storing data of an application to be executed.

The image signal to be displayed may be received, for example, from an external video source, and then stored in the second part 2012.

In addition, for example, when the application processor is started up, the correction data for performing Mura correction on the image signal is read from a nonvolatile memory (e.g., Flash ROM) of a display device into the first part 2013 of the RAM memory of the application processor.

In addition, as shown in FIG. 2, the first output port 202 is connected to the second part 2012 of the memory, and transmits data of the image signal stored in the second part 2012 of the memory to a first receiving port of an external display driving circuit through a first transmission path.

The second output port 203 is connected to the first part 2013 of the memory and transmits the correction data stored in the first part 2011 of the memory to a second receiving port of the external display driving circuit through a second transmission path separated from the first transmission path.

In addition, the application processor 200 may further have additional input/output ports other than the first output port 202 and the second output port 203.

In addition, the application processor 200 may further comprise a control circuit. The control circuit may receive an externally inputted setting command for setting which port of the application processor is used to read correction data from a storage of the external display device to a port of the first part of the memory.

Specifically, when the application processor boots up, correction data for Mura correction stored in Flash ROM of the display device can be read into the first part 2013 of the RAM memory of the application processor by setting a port for command setting.

Figure 3:
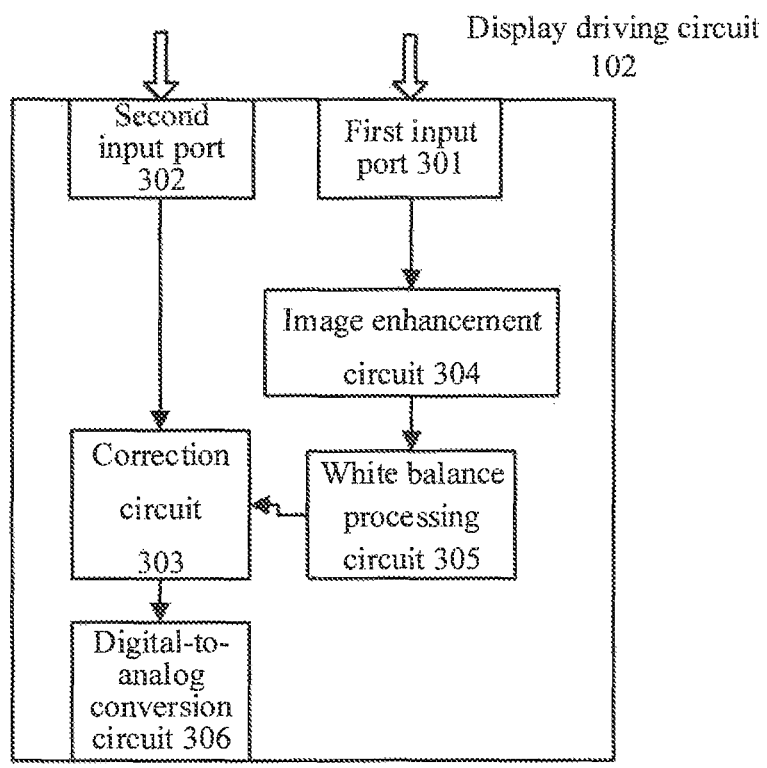
FIG. 3 is a configuration block diagram illustrating a display driving circuit in the electronic apparatus according to the first embodiment of the present disclosure.

FIG. 3 shows a block diagram of a display driving circuit according to an embodiment of the present disclosure.

As shown in FIG. 3, the display driving circuit 300 connected to the application processor 200 comprises:

a first input port 301 configured to receive data of an image signal for executing displaying as inputted from an external processor:

a second input port 302 configured to receive correction data for performing a predetermined correction operation on the received image signal as inputted from the external processor; and a correction circuit 303 configured to perform the predetermined correction operation on the received image signal by using the received correction data.

Specifically, the display driving circuit 300 receives, through the first input port 301, the image signal for displaying as transmitted from the second part 2012 of the memory of the application processor 200.

The display driving circuit 300 receives, through the second input port 302, the correction data for performing a predetermined correction operation as transmitted from the first part 2011 of the memory of the application processor 200. This correction data is, for example, correction data for performing Mura correction.

Optionally, the display driving circuit 300 further comprises an image enhancement circuit 304 configured to perform image enhancement processing on the image signal received through the first input port. The image enhancement processing may be an image quality improvement processing, an optical compensation processing, an OLED compensation processing or the like peculiar to manufacturers of respective display devices.

The display driving circuit 300 further comprises a white balance processing circuit 305 configured to perform white balance processing on the image signal that has been subjected to image enhancement processing and to output the image data that has been subjected to white balance processing to the correction circuit.

The correction circuit 303 may perform compensation processing of removing Mura with the correction data on the image data that has been subjected to white balance processing. Mura correction may be performed, for example, by combining the image data that has been subjected to white balance processing with the correction data used for Mura correction in an IP core for compensation.

Accordingly, the correction circuit 303 may, for example, optionally comprise a linear memory for storing the correction data and the image data that has been subjected to white balance processing, wherein the correction data is a compensation coefficient for performing compensation processing of removing Mura on the image signal.

In addition, the display driving circuit 300 further comprises a digital-to-analog conversion circuit 306 configured to convert the digital image signal that has been subjected to the processing of removing Mura as executed by the correction circuit into an analog signal and to output the analog signal to a display panel 103.

Optionally, the display driving circuit further comprises a frame buffer memory disposed between the correction circuit and the digital-to-analog conversion circuit, and frame buffer memory stores data of the image signal of one frame to support an MIPI command mode.

Second Embodiment

The processor, the display driving circuit, and the electronic device according to a second embodiment of the present disclosure will be described below in detail with reference to FIGS. 4 to 5. Such electronic device may be, for example, a mobile terminal device such as smart phone, tablet, PDA, or the like. In this embodiment, description will be given taking smart phone as an example.

Figure 4:
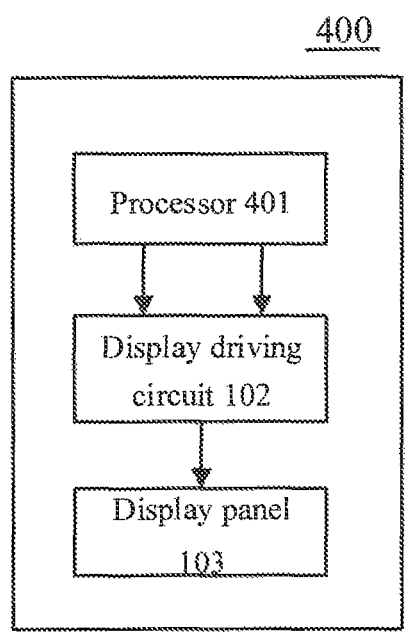
FIG. 4 is a configuration block diagram illustrating an electronic device according to a second embodiment of the present disclosure.

FIG. 4 is a configuration block diagram illustrating an electronic device according to a second embodiment of the present disclosure. As shown in FIG. 4, the electronic device 400 according to the second embodiment of the present disclosure comprises:

a processor 401 configured to store, in a memory thereof, data of an image signal to be displayed and store correction data for correcting an image signal;

a display driving circuit 402 configured to receive the image signal and the correction data separately transmitted from the processor, perform correction processing on the image signal, and output the corrected image signal; and a display panel 403 configured to receive the image signal outputted from the display driving circuit and thereby carry out image displaying accordingly.

In this embodiment, the processor 1401 is, for example, an application processor in a smart phone.

The electronic device 400 according to the second embodiment is substantially the same as the electronic device 100 according to the first embodiment, except the processor 401.

Next, more emphasis is given to description of the processor 401, and detailed description of the other parts will be omitted.

Figure 5:
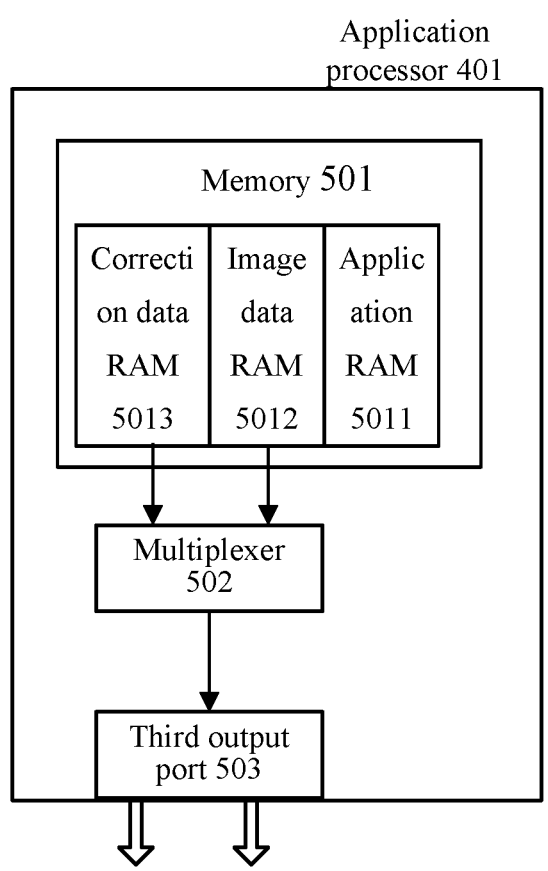
FIG. 5 is a configuration block diagram illustrating a processor in the electronic device according to the second embodiment of the present disclosure.

As shown in FIG. 5, the processor 401 in a second example according to an embodiment of the present disclosure comprises:

a memory 501 being divided into a first part that stores correction data for correcting an image signal, a second part that stores data of an image signal to be displayed, and a third part that stores data of an application to be executed;

a multiplexer 502 configured to receive the data of the image signal and the correction data stored in the memory;

a third output port 503 configured to transmit the data of the image signal received by the multiplexer to a first receiving port of the external display driving circuit and to transmit the correction data received by the multiplexer to a second receiving port of the external display driving circuit, in a time division manner and through a third transmission path.

Specifically, as shown in FIG. 5, the RAM memory 501 internal to the application processor 500 in the electronic device is divided into three parts. The first part 5013 stores correction data for correcting an image signal. The second part 5012 stores data of an image signal to be displayed. The third part 5011 is for storing data of an application to be executed.

The image signal to be displayed may be received, for example, from an external video source and then stored in the second part 5012.

In addition, for example, when the application processor is started up, the correction data for performing Mura correction on the image signal is read from a nonvolatile memory (e.g., Flash ROM) of a display device into the first part 5013 of the RAM memory of the application processor.

In addition, as shown in FIG. 4, a first input terminal of the multiplexer 502 is connected to the second part 5012 of the memory, a second input terminal of the multiplexer 502 is connected to the first part 5013 of the memory, and an output terminal of the multiplexer 502 is connected to the third output port 503.

The multiplexer 502 selectively outputs the data of the image signal stored in the second part 5012 of the memory and the correction data stored in the first part 5013 of the memory in a time division manner.

The third output port 503 transmits the data of the image signal received by the multiplexer to a first receiving port of the external display driving circuit and transmits the correction data to a second receiving port of the external display driving circuit, in a time division manner and through the third transmission path.

The display driving circuit receives the data of the image signal through the first receiving port and receives the correction data through the second receiving port. The display driving circuit also performs correction processing on the data of the image signal received by using the received correction data. This correction processing is, for example, correction processing of removing Mura.

Finally, the display driving circuit outputs the data of the image signal that has been subjected to the Mura correction processing to a display panel for displaying.

In addition, the application processor 500 may further have additional input/output ports other than the third output port 503.

In addition, the application processor 500 may further comprise a control circuit. The control circuit may receive an externally inputted setting command for setting which port of the application processor is used to read correction data from a storage of the external display device to a port of the first part of the memory.

Specifically, when the application processor boots up, correction data for Mura correction stored in Flash ROM of the display device can be read into the RAM memory of the application processor by setting a port for command setting.

The display driving circuit 102 and the display panel 103 of the electronic device 500 according to the second embodiment are the same as the corresponding components in the electronic device 100 according to the first embodiment, thereby are denoted with the same reference numerals herein, and detailed description is omitted.

In this way, the RAM memory of the application processor may be used to store the correction data for Mura correction, the need for providing a memory for storing the correction data for Mura correction in the display device can be eliminated, thereby cost is reduced, and the problem of limited memory size in the display device is solved.

In addition, since the application processor does not need to perform Mura correction by itself, various image processing and correction processing are performed by the external driving method instead, it does not result in a decrease in arithmetic capability of the application processor. In addition, the external display driving circuit can use image quality improvement algorithms peculiar to manufacturers of the respective display devices, and thereby produce standard products.

Therefore, the processor, the display driver, and the electronic device according to the embodiments of the present disclosure are capable of performing various image correction processing on an image signal without requiring a large-capacity external compensation RAM memory.

As will be noted, the above embodiments are merely exemplary, the present disclosure is not limited to those embodiments, various modifications may be made thereto.

It should be noted that, in the specification, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise one . . . " do not exclude there being additional identity elements in the procedure, method, product or equipment of the elements.

Finally, it should be noted that, the above-described series of processing do not only comprise processing executed chronologically in the order mentioned here, and also comprise processing executed in parallel or individually but not chronologically.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and include several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and applications. To sum up, contents of this specification should not be construed as limiting the present disclosure.

What is claimed is:
1. A processor, comprising:
a memory being divided into a first part that stores correction data for correcting an image signal, a second part that stores data of an image signal to be displayed, and a third part that stores data of an application to be executed;

an output port configured to transmit the data of the image signal and the correction data stored in the memory to an external display driving circuit, separately; and a control circuit configured to receive a setting command inputted externally and to determine a port for reading correction data from a storage of an external display device into the first part of the memory a ding to the setting command;

wherein the output port comprises:

a multiplexer configured to receive the data of the image signal and the correction data stored in the memory; and a third output port configured to transmit the data of the image signal received by the multiplexer to a first receiving port of the external display driving circuit and to transmit the correction data received by the multiplexer to a second receiving port of the external display driving circuit, in a time division manner and through at transmission path; and wherein the correction data is a compensation coefficient for performing compensation processing of removing non-uniformity on the image signal that has been subjected to white balance processing.

2. The processor of claim 1, wherein the processor is an application processor in a mobile terminal device, and the memory is a volatile memory used as an internal memory of the processor.

3. The processor of claim 1, further comprising:

a correction circuit configured to perform a predetermined correction operation on the image signal by using the correction data.

4. An electronic device, comprising:

a processor according to claim 1;

a display driving circuit including a first input port configured to receive data of an image signal for executing displaying as inputted from an external processor; a second input port configured to receive correction data for performing a predetermined correction operation on the received image signal as inputted from the external processor; and a correction circuit configured to perform the predetermined correction operation on the received image signal by using the received correction data;

a display panel configured to perform image displaying according to the analog signal outputted from the display driving circuit.

5. A display driving circuit, comprising:

a first input port configured to receive data of an image signal for executing displaying as inputted from an external processor;

a second input port configured to receive correction data for performing a predetermined correction operation on the received image signal as inputted from the external processor;

a correction circuit configured to perform the predetermined correction operation on the received image signal by using the received correction data; and a frame buffer memory disposed between correction circuit and the digital-to-analog conversion circuit, and configured to store data of the image signal of one frame to support an MIPI command mode;

wherein the correction circuit further comprises:

a linear memory configured to store the correction data and the image data that has been subjected to white balance processing, the correction data being a compensation coefficient for performing compensation processing of removing non-uniformity on the image signal; and the correction circuit performs compensation processing of removing non-uniformity on the image data that has been subjected to white balance processing by using the correction data.

6. The display driving circuit of claim 5, further comprising:

an image enhancement circuit configured to perform image enhancement processing on the image signal received through the first input port; and a white balance processing circuit configured to perform the white balance processing on the image signal that has been subjected to image enhancement processing and to output the image data that has been subjected to the white balance processing to the correction circuit.

7. The display driving circuit of claim 5, further comprising:

a digital-to-analog conversion circuit configured to convert the image signal that has been subjected to the compensation processing of removing non-uniformity as executed by the correction circuit into an analog signal and to output the analog signal to a display device.

* * * * *